UNITED STATES PATENT OFFICE 2,500,734

PROCESS OF PREPARING 2-ETHYLDI-BENZOFURAN

Royal K. Abbott, Jr., Pittsfield, Mass., assignor to General Electric Company, a corporation of New York No Drawing. Application June 13, 1946,
Serial No. 676,570

4 Claims. (Cl. 260—346)

This invention relates to a method of preparing 2-ethyldibenzofuran. More particularly the invention is concerned with a method of preparing 2-ethyldibenzofuran comprising acetylating dibenzofuran in the presence of a Friedel-Crafts type catalyst, e. g., aluminum chloride, aluminum bromide, ferric chloride, zinc chloride, boron fluoride, hydrogen fluoride, sulfuric acid, etc., and reducing the resulting 2-acetyldibenzofuran, in a hydrogen atmosphere in the presence of a catalyst, to 2-ethyldibenzofuran.

The following equations illustrate the reactions involved in employing the method of my invention:

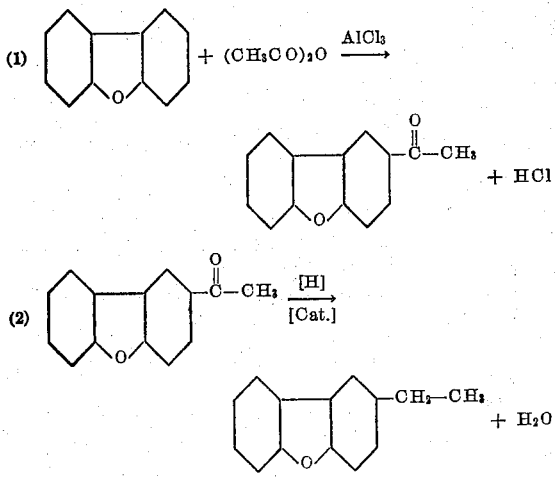

2-acetyldibenzofuran is prepared as illustrated in Equation 1 by reacting dibenzofuran with an acetylating agent, e. g., acetyl chloride or acetic anhydride, in the presence of aluminum chloride or other Friedel-Crafts type catalyst. After the reaction is complete, the 2-acetyldibenzofuran is removed from the reaction mass and purified by distillation. The method of carrying out the above reaction and the method of purifying the resulting product will be described hereinafter in more detail.

In order to obtain as high a yield of 2-ethyldibenzofuran as possible from the reduction of the 2-acetyldibenzofuran, it is important that the 2-acetyldibenzofuran be of a high degree of purity. After completion of the Friedel-Crafts reaction, Equation 1, the reaction mass may contain residual reactants and various by-products. For example, small amounts of 2,8-diacetyldibenzofuran, and some triacetyldibenzofuran, or even more highly substituted compounds may be found in the reaction mixture. In addition, small amounts of isomers of the 2-acetyldibenzofuran may be formed. I have found that satisfactorily pure ketone is obtained by distilling the crude reaction product from the Friedel-Crafts reaction at 1 mm. pressure and then refractionating at 15 mm. pressure. The narrow cut boiling between about 215° C. and 220° C. at 15 mm. pressure is substantially pure 2-acetyldibenzofuran.

The 2-acetyldibenzofuran is reduced in a hydrogen atmosphere in the presence of a suitable catalyst as illustrated by Equation 2. It has been found desirable to carry out the reduction of the ketone in solution. Methanol is normally used as a solvent because of its relatively low cost and the quality of the product obtained, but ethanol, propanol, isopropanol and other higher aliphatic alcohols may be employed, as well as dioxane, benzene, toluene, cyclohexane, methylcyclohexane, and similar related compounds. As catalysts for the reduction of the ketone, copper chromite and Raney nickel have been found to be particularly satisfactory. In order to obtain as complete reduction of the ketone to 2-ethyldibenzofuran as possible, catalyst concentrations of between 6 and 10 percent, by weight, of the ketone present in the reaction mixture are preferable. Lower catalyst concentrations tend to cause incompleteness of reduction. Thus, where less than 5 per cent catalyst has been employed, tests have indicated the presence of appreciable quantities of unreduced ketone in the reaction mass.

Hydrogen pressures of at least 1000 pounds per square inch are desirable for carrying out the reduction of the ketone. At pressures less than 1000 pounds per square inch the reduction tends to be incomplete. Pressures of 1500 to 2000 pounds per square inch are preferable from the standpoint of completeness of reduction and simplicity of equipment required. However, pressures substantially above 2000 pounds per square inch, e. g., 3000 to 5000 pounds or more per square inch, may be employed if desired.

Reaction temperatures of between approximately 170° C. and 200° C. are preferable, although it should be understood that some reduction of the ketone takes place at temperatures as low as 130° C. However, at temperatures below about 150° C. the reduction of the ketone tends to extend only to the carbinol stage, yielding a product containing appreciable quantities of the carbinol. A reduction time of from 6 to 8 hours at 180° C. and at the pressures indicated heretofore as preferable is generally sufficient to completely reduce the ketone to 2-ethyldibenzofuran.

In order to obtain the most effective contact of the hydrogen with the liquid phase on the surface of the catalyst, it is advantageous to agitate the reaction mixture during the reduction.

In order that those skilled in the art may better understand how to practice the present invention, the following examples are illustrative of the procedure which may be used in the preparation of 2-ethyldibenzofuran:

PREPARATION OF 2-ACETYLDIBENZOFURAN

Example 1

504 gms. (3.0 mols) of dibenzofuran was placed in a 5-liter, three-necked flask, equipped with the conventional stirrer, reflux condenser and dropping funnel. 1750 ml. of carbon disulfide was then added and the mixture stirred 20 minutes to solution. The heat of the solution is strongly negative. 600 gms. (4.5 mols) of anhydrous powdered aluminum chloride was then added and the mixture stirred for ½ hour, after which 258 gms. (3.3 mols) of acetyl chloride were added dropwise over a period of 6 hours. Stirring was continued, and toward the end of the reaction the mixture thinned out considerably. The reaction mixture was then heated to reflux by stirring for an additional 6 hours when it no longer evolved appreciable amounts of hydrogen chloride and was then allowed to stand overnight, after which two liters of 1-1 hydrochloric acid were added very slowly. Six hours was required for the complete hydrolysis.

In order to increase the density of the lower (organic) layer, 5 pounds of carbon tetrachloride was added and the layers separated. The organic layer was filtered, washed six times with water, filtered, dried with calcium chloride and the solvents removed and stripped on a water pump. The reaction mixture was then cooled and distilled under reduced pressure.

51.2% of the fraction was recovered as the monoketone. This fraction, weighing 322 gms., was redistilled under 15 mm. pressure. The picrate of 2-acetyldibenzofuran was obtained as light yellow needles, melting point 81–83° C.

Example 2

2,520 grams (15 mols) of dibenzofuran was dissolved in three liters of nitrobenzene in a 5-liter flask. Continuous mechanical stirring was used and a small amount of heat was necessary as the heat of solution of dibenzofuran in nitrobenzene is negative. 8.2 liters of nitrobenzene was placed in a 22-liter flask provided with a mechanical stirrer and surrounded by a cooling bath maintained at 15° C. The neck of the flask was allowed to remain open throughout the reaction. 3,990 grams (30 mols) of aluminum chloride was then added to the nitrobenzene in the 22-liter flask. This addition was made over a period of approximately 30 minutes and with constant stirring to avoid over-heating by the heat of solution of aluminum chloride in nitrobenzene. The dibenzofuran solution in nitrobenzene was then added to the aluminum chloride solution through a dropping funnel over a period of about 20 minutes. 1835 grams (18 mols) of acetic anhydride were then added dropwise to the nitrobenzene solution of dibenzofuran and aluminum chloride at such a rate as to keep the reaction temperature at about 30° C. The addition required 2¼ hours and the reaction was continued, with stirring, for an additional hour.

Hydrolysis was then accomplished by adding 5 liters of water at such a rate that the temperature rose to about 80° C. About 4 hours was required for the hydrolysis. After hydrolysis was complete, the reaction mass was allowed to cool, the aqueous layer was siphoned off and the organic layer was washed three times with water, once with 5 percent sodium hydroxide solution, and three more times with distilled water. The nitrobenzene was then removed by steam distillation and the solvent-free reaction mass was distilled at a pressure of about 0.15 mm. 2819 grams of acetyldibenzofuran was obtained.

PREPARATION OF 2-ETHYLDIBENZOFURAN

Example 3

1000 gms. of pure redistilled 2-acetyldibenzofuran, prepared as illustrated above, was placed in a high pressure hydrogenation autoclave of four-liter capacity, and one liter of C. P. methanol was added together with 70 grams (7 percent) of copper chromite catalyst, all of which was fine enough to pass a 200-mesh sieve. The autoclave was closed and the reaction mixture was subjected to rocking agitation under 1500 pounds per square inch pressure of hydrogen for 8 hours at a temperature of 180° C. At the end of this time the autoclave was cooled, the hydrogen was valved, and the catalyst was removed from the thin liquid by filtration. The solvent was then stripped from the liquid by means of a water pump and the remaining higher boiling material was redistilled under a pressure of 11 mm. The 2-ethyldibenzofuran was a sharply defined fraction boiling between 170° C. and 173° C. The product was a clear, nearly colorless liquid having an index of refraction of $n_D^{25}=1.6173$ and a density of $d_4^{20}=1.117$.

The 2-ethyldibenzofuran prepared by the method of my invention is useful as an intermediate in the preparation of other compounds. For example, it may be employed in the preparation of vinyldibenzofuran as described and claimed in my copending application, Serial No. 676,569, filed concurrently herewith, and assigned to the assignee of the present invention.

What I claim as new and desire to secure by Letters Patent of the United States is:

1. The method of preparing 2-ethyldibenzofuran which comprises reducing an organic liquid solution of 2-acetyldibenzofuran with hydrogen at a pressure of at least about 1000 pounds per square inch and at a temperature of from about 170° C. to 200° C. in the presence of from 6 to 10%, by weight, copper chromite as a catalyst, based on the weight of the 2-acetyldibenzofuran, and separating the resulting 2-ethyldibenzofuran from the reaction mixture by distillation.

2. The method of preparing 2-ethyldibenzofuran which comprises reducing a methanol solution of 2-acetyldibenzofuran in intimate contact with hydrogen at a pressure of from about 1500 to about 2000 pounds per square inch and at a temperature of from about 170° C. to about 200° C. in the presence of from 6 to 10%, by weight, copper chromite as a catalyst, based on the weight of the 2-acetyldibenzofuran, and separating the resulting 2-ethyldibenzofuran from the reaction mixture by distillation.

3. The method of preparing 2-ethyldibenzofuran which comprises reducing an organic liquid solution of 2-acetyldibenzofuran with hydrogen at a pressure of at least 1000 pounds per square inch and at a temperature of from about 170° C. to 200° C. in the presence of from 6 to 10%, by weight, of a hydrogenation catalyst, the latter being based on the weight of the 2-acetyldibenzofuran, and separating the resulting 2-ethyldibenzofuran from the reaction mixture by distillation.

4. The method of preparing 2-ethyldibenzofuran which comprises reducing a methanol solution of 2-acetyldibenzofuran with hydrogen at a pressure of around 1500 pounds per square inch and at a temperature of approximately 180° C. in the presence of about 7%, by weight, of a copper chromite catalyst, the weight of the latter being based on the weight of the 2-acetyldibenzofuran, and separating the formed 2-ethyldibenzofuran from the reaction mixture by distillation.

ROYAL K. ABBOTT, Jr.

REFERENCES CITED

The following references are of record in the file of this patent:

"Catalysis," by Berkman et al., published by Reinhold Pub. Corp., N. Y. C., 1940, p. 848.

Chemical Abstracts, 1935, vol. 29, page 791, line 5.

Galewsky, Annalen, vol. 264, pages 189 and 190.

Chemical Abstracts, vol. 37, page 3744, 1943.